United States Patent [19]
Beaudin

[11] 3,965,933
[45] June 29, 1976

[54] AIR DUCT MADE FROM SHEET METAL STAMPING

[76] Inventor: Patrick L. Beaudin, 1112 Fremont, NW., Grand Rapids, Mich. 49504

[22] Filed: Nov. 15, 1974

[21] Appl. No.: 524,225

[52] U.S. Cl. ............................... 137/610; 29/190; 138/162; 138/163
[51] Int. Cl.² ............................................. F17D 1/02
[58] Field of Search ............ 29/190, 18 A; 138/162, 138/163, DIG. 4; 285/424; 137/610

[56] References Cited
UNITED STATES PATENTS

| 525,467 | 9/1894 | McMillin | 138/DIG. 4 |
| 2,144,646 | 1/1939 | Zalkind | 285/424 X |
| 2,359,725 | 10/1944 | Berger et al. | 285/424 X |

OTHER PUBLICATIONS

*Duc-Pac* Duc-Pac Inc., 1956, Bulletin 654, pp. 1-4, East Longmeadow, Mass., 1956.
*Time Saving Furnace Pipe and Fittings*, Bulletin No. 155, Buckeye Furnace Pipe Co., Columbus, Ohio, 1955.
*Pipe and Ductwork Section of Catalog No. 51*, F. Meyer & Bro. Co., Peoria, Illinois, 7/1/1938.

*Primary Examiner*—Arthur J. Steiner
*Attorney, Agent, or Firm*—Price, Heneveld, Huizenga & Cooper

[57] ABSTRACT

A sheet metal stamping forming an air duct for use in heating and cooling systems and the like. The stamping has a generally rectangular shaped body portion and a protruding tongue portion extending from at least one side thereof. The stamping is foldable along its end edges and the tongue portion whereby two such stampings may be cooperatively engageable with a pair of side panels to form an air duct section having an inlet, outlet and a diverter or secondary outlet formed by the tongue portions. The tongue portions are adapted for connection to standard conventional take-off fittings.

4 Claims, 7 Drawing Figures

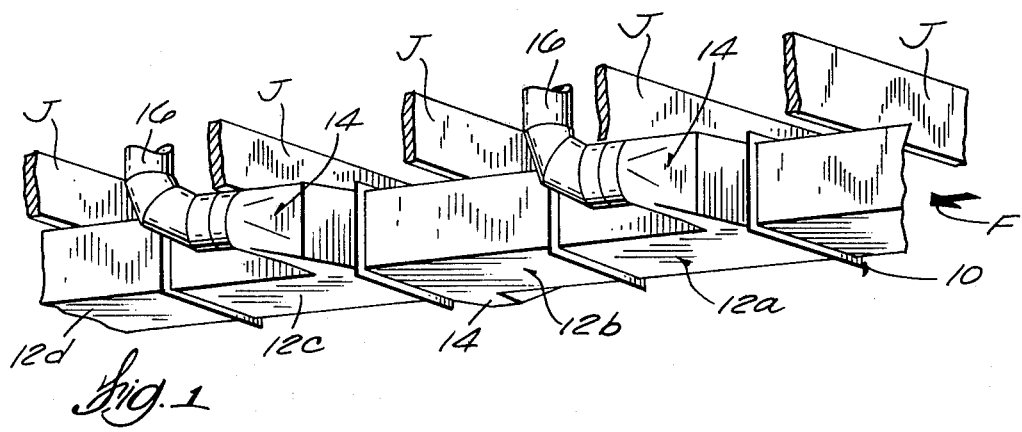
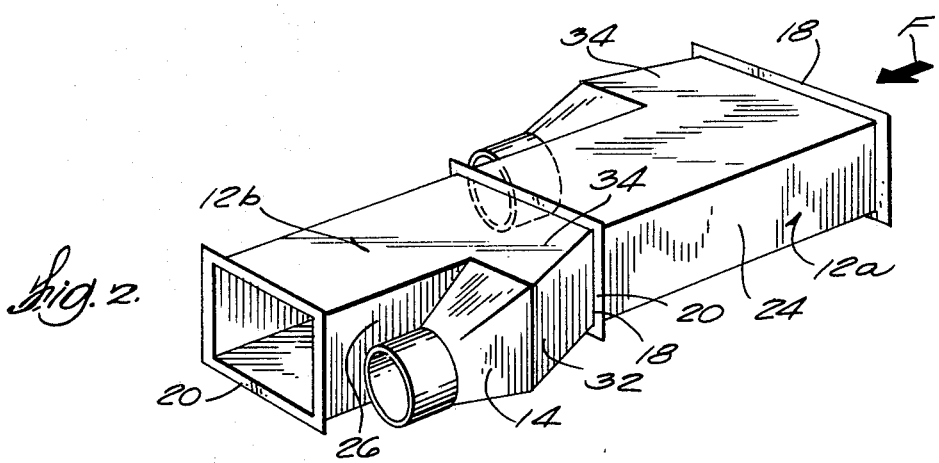
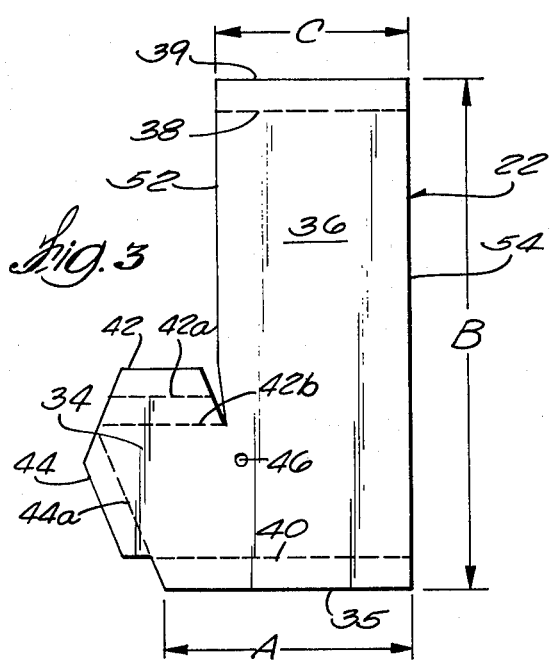
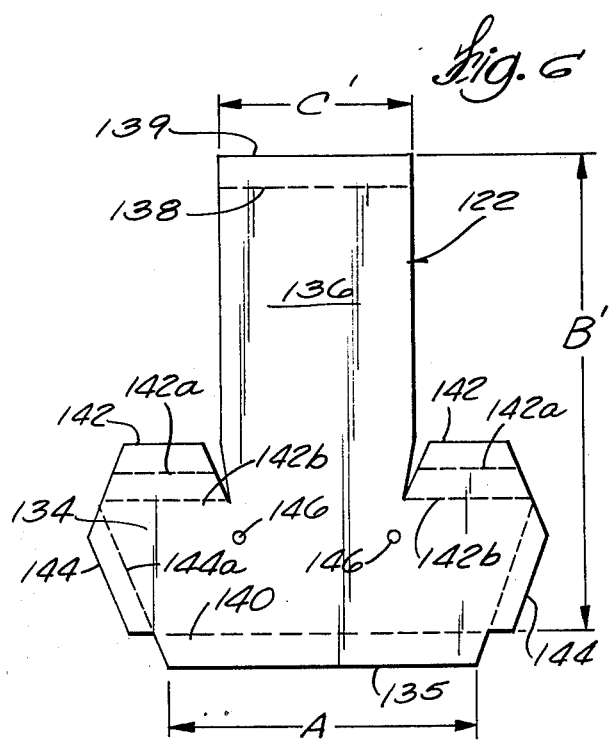

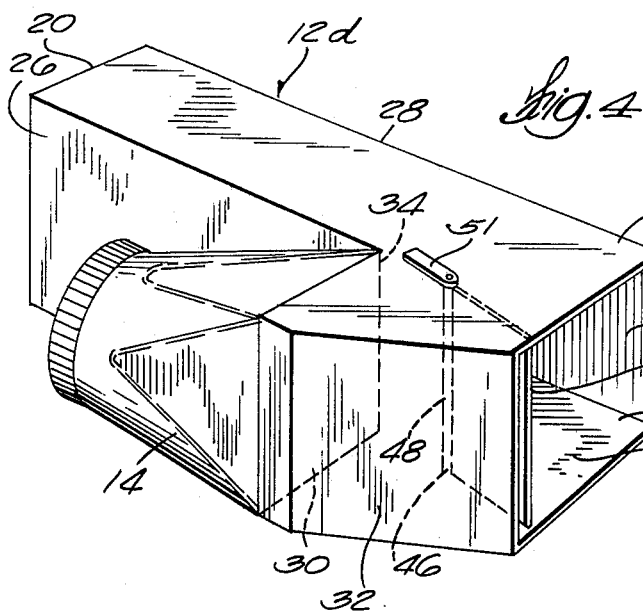
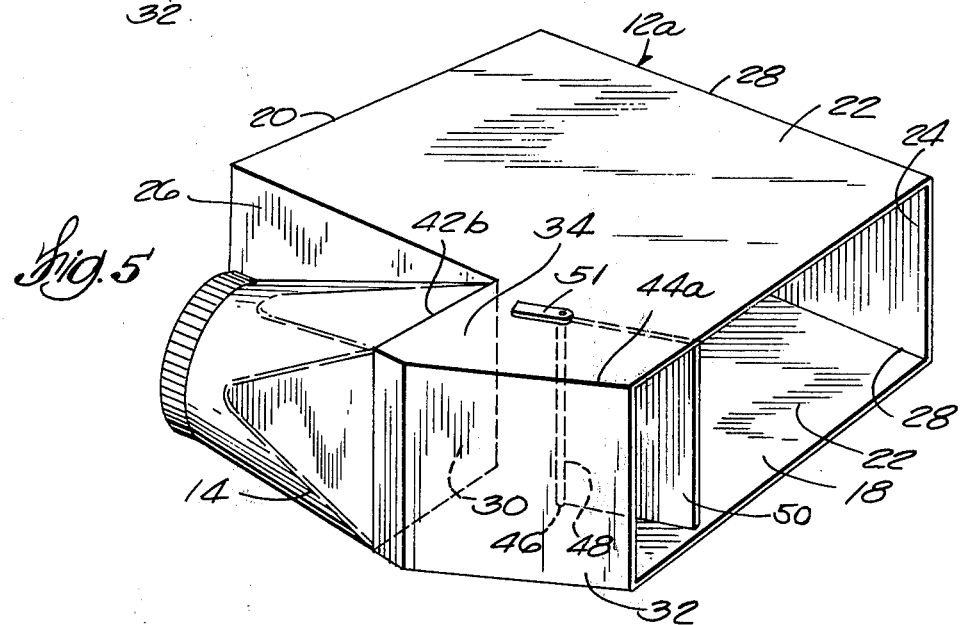
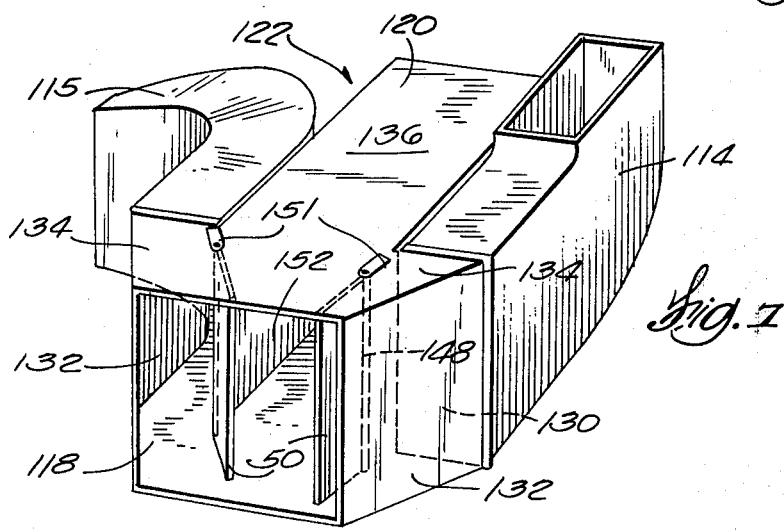

AIR DUCT MADE FROM SHEET METAL STAMPING

BACKGROUND OF THE INVENTION

This invention relates to sheet metal duct work fittings of the type used in heating, ventilating and air conditioning systems. Generally, in systems of this type, the main air supply is conveyed through sheet metal duct work from a central source. A main distribution duct is provided, which at spaced intervals includes take-off fittings through which branch lines are supplied from the main duct. The main conduit typically is rectangular and has a constant cross sectional area along its length. No compensation is made for the air volume carried therein. Outlets near the source accordingly provide an extremely high air flow while those remote from the source provide a considerably reduced air flow.

The prior art has recognized the advantages of a main conduit or trunk duct having reductions in cross sectional area along its length to provide generally equal air flow at each outlet. Such systems are however, relatively expensive and accordingly have not found commercial acceptance. Partially prefabricated air duct fittings have been proposed for use in heating and ventilating systems, however, in each case a great number of separate component parts are required including top and bottom panels, take-off sections, side panels and the like. In some of prior art systems the top and bottom panels and the side walls are provided with spaced longitudinally extending marginal tabs and corresponding slots. The tabs, when inserted in the slots are bent over to secure the plate and wall together in a rigid assembly. Such systems, however, require careful handling since the tabs are easily deformed during such handling. Additionally, if an ar tight seal is required, the tabs and slot must be sealed with putty, or similar sealing substances.

In another system known in the prior art, prefabricated assembled components of the duct system are provided. Each component is reduced in cross sectional size from the previous adjacent component whereby they may be nested for shipment and storage. In the above systems, however, separate provision must be made for the connection of take-off ducts and other fittings to registers or wall stacks or the like. In these cases either elaborate tab and slot combinations must be prefabricated or otherwise provided or in the case of the nestable preassembly an opening must be cut in the duct work in each position where it is desired to connect the take-off section.

SUMMARY OF THE INVENTION

While the above described systems are known in the art, it yet remains necessary to provide a totally standardized system which is readily assembled, relatively inexpensive and which utilizes standardized parts. The system of the present invention is designed for the least restriction of air from the heating or cooling system through the main ducts and into the take-off or leader pipes. A generally standard shaped fitting based on a modular construction concept is provided having a standard length and a variable width based on a preestablished range of sizes. A single fitting which provides top and bottom plates of a duct system is adapted for utilization with side panels and includes at least one outwardly extending tongue member thereon forming a diverter or take-off section on which any of a large number of standard take-off fittings may be attached. Since the system is based on a standard length for each preformed fitting, layout is considerably simplified, and in fact quick and relatively accurate calculations to determine the total length of the system may readily be made simply by counting as for example, in a residential building, the number of floor joists to lay out the entire system. In the preferred embodiment of the invention, each panel section is fabricated from a stamping and has a lip or other fastening means formed at the ends and edges thereof. Each section has a standard length of 16 inches or multiples thereof which correspond to the conventional spacing between floor joists.

The standardized system of the present invention is applicable to generally all heating installations and specifically adapted for home heating situations. The expense of custom-made installations is reduced. Each section formed in accordance with the present invention has an inlet side and a diminished outlet side thereby providing, when assembled, a heating system in which the main trunk line is decreased at each take-off junction to thus proportion and reduce the cross sectional area of the main trunk line along its length.

Basically, the invention provides a sheet metal duct section having an inlet and an outlet and includes prestamped upper and lower spaced panels interconnected by spaced side panels. At least one side panel is shorter in length than the upper and lower panels thereby defining an opening through which at least a portion of the flow of air through the inlet portion is diverted. The upper and lower panels are prestamped and have a central body portion extending the length and width of the duct from the inlet to the outlet and a tongue portion is formed thereon extending laterally beyond the shortened side. The tongue portion is folded for connection to a diverter or take-off duct section. Finally, a secondary side panel joins the tongue portions to form the diverter duct.

The many advantages of the present invention will become apparent to those skilled in the art upon reading the following description with reference to the accompanying drawings illustrating the preferred embodiment of the invention.

BRIEF DESCRIPTION OF THE DRAWINGS

FIG. 1 is a perspective view of a portion of an air duct system incorporating the present invention;

FIG. 2 is a perspective view illustrating a pair of take-off sections of the present invention connected together;

FIG. 3 is a top plan view of a stamping used for forming the top and bottom panels of the duct sections shown in FIGS. 1 and 2;

FIG. 4 is a perspective view illustrating the duct section and the diverter valve contained therein;

FIG. 5 is a view similar to FIG. 4 illustrating a similar duct section having a larger cross sectional configuration;

FIG. 6 is a top plan view of a stamping utilized in the construction of a duct having a take-off section located at either side thereof; and FIG. 7 is a perspective view illustrating a duct section utilizing upper and lower stampings of the type shown in FIG. 6.

DESCRIPTION OF THE PREFERRED EMBODIMENT

Referring now to the drawings, FIG. 1 illustrates a portion of an air distribution system in which a main trunk line 10 is fabricated from a series of individual duct sections 12a, 12b, 12c etc., constructed in accordance with the present invention. Take-off duct sections 14 of conventional construction are connected to the main trunk line 10 at suitable spaced intervals. Typically in a residential construction the entire assembly is mounted between conventional joists J forming the floor of the structure. Conventional pipes or other duct sections 16 extending from take-off sections 14 are directed to suitable floor registers, wall outlets and the like (not shown).

In accordance with the invention, each duct section 12 has a length corresponding to the standard spacing between each adjacent pair of floor joists J or multiples thereof. Typically, in residential construction, floor joists are spaced 16 inches between centers. Accordingly, each duct section may have a length of 16 inches, 32 inches, 48 inches or other convenient length based on a multiple of 16 inches.

Referring to FIG. 2, a pair of duct sections 12a and 12b are shown connected together. The direction of air flow therethrough is normally in a direction as indicated by the arrow F (shown also in FIG. 1) from an inlet end 18 of each duct section 12 to an outlet end 20. The outlet 20 of a first duct section i.e. 12a, connects to the inlet section 18 of the next adjacent section 12b. It will be noted that the inlet opening 18 is somewhat larger than the outlet opening 20 such that air moving therethrough moves from a larger to a smaller opening to proportion the cubic feet of air carried therethrough and to the outlet. It will be further noted that each section is proportionately smaller in cross section than the next adjacent section so that as for example, outlet 20 of section 12a corresponds to the inlet 18 of section 12b. Similarly, outlet 20 of section 12b is reduced in size to correspond to the inlet 18 of the next adjacent section 12c.

Individual duct sections of proportionately larger sizes 12a and 12d are shown in greater detail in FIGS. 4 and 5. Each duct section 12 includes previously described inlet 18 and outlet 20. The duct is formed by means of prestamped, identical, upper and lower panels 22 interconnected by suitable side panels 24 and 26. One side panel 24 extends the entire length of a side edge 28 of the upper and lower panels 22, while the opposite side panel 26 is shorter in length to form an outlet opening 30 through which air flow is directed to take-off section 14. A secondary side panel 32 joins outwardly extending tongue-like portions 34 of each panel 22 together to form the outlet opening 30 as will be more fully described hereinafter.

Referring to FIG. 3, the sheet metal stamping forming panel 22 is shown in plan view. Panel 22 is generally rectangular in configuration having a central body portion 36 from which the previously mentioned tongue portion 34 extends outwardly at one end 35 and side 52 thereof. The end portion 35 of the stamping forming the inlet (dimension A) corresponds approximately to the desired width dimension at the inlet end of the completed duct section 12. The longer lengthwise dimension B when completed, is equal to 16 inches or multiples thereof, so as to correspond to the normal spacing between centers of the floor joists J (FIG. 1).

The dimension C at end portion 39 corresponds to the width dimension of the outlet end 20 of the completed duct section. Preferably width A is 2 inches larger than width C in a duct section having a single take-off opening 30. Each adjacent section similarly is reduced by 2 inches in overall width from inlet end to outlet end. The desired final dimension B as indicated by the dotted lines 38 and 40 at each end of the panel 10 provide the additional material required to form a conventional connector by which adjacent ducts are coupled together. Accordingly, the length of the stamped panel 22 is somewhat greater than the dimension B on the order of approximately one-half inch at each end. In other words, a duct section having a length of 16 inches when completed, will be formed to have a total overall length of approximately 17 inches thus allowing one-half inch at each end for forming the connection.

The tongue-like element 34 is similarly provided with extra material at its forward edge 42 and its side edge 44 such that it may be folded along the dotted lines 42a, 42b at the front and on lines 44a at the side edge. Finally, an opening 46 is punched through the panel at the approximate intersection of the main duct forming portion, or body 36, and the tongue 34. Opening 46 serves, as will be seen in FIGS. 4 and 5, as a convenient mounting place for a shaft 48 which pivotally carries a conventional diverter valve member 50 to direct or block the flow of air through the duct and into the take-off 14 through opening 30. A handle 51 connected to shaft 48 at the exterior of the duct is used to turn the diverter valve 50 into the desired position.

The material folded along lines 38, 40, 42a, 42b and 44a is formed in a conventional manner with suitable forming tools and may be formed so as to have any desired conventional manner with suitable forming tools and may be formed so as to have any desired conventional configuration. The connection at take-off 14 is preferably formed along lines 42a and 42b to form one side of the conventional flat lock joint well known to those skilled in the art. The material along side 44 bent along the line 44a and also at the short side panel 52 and along side 54 is similarly folded for connection to the side walls 32, 26 and 24 respectively. Preferably, the side walls and edges of panel 22 are formed with a "Pittsburgh" corner lock the details of which are also well known to those skilled in the art. Finally, the material forming the inlet and outlet ends 18 and 20, i.e. edges 39 and 35 is bent along lines 38 and 40, into any standard lock configuration to receive a cap strip connector or the like to connect adjacent duct sections together. It will be noted that when the material is folded along lines 58 and 40 the dimension B of the finished panel will be 16 inches or a multiple thereof.

Referring to FIGS. 6 and 7, a modified stamping and duct section formed therewith is illustrated. Since this alternate structure is similar to that previously described, like reference numerals prefixed by the numeral 100 identify like parts. In this embodiment, stamping 122 includes a main body portion 136 from which a pair of outwardly extending tongue-like portions 134 extend. The overall length B', corresponding to dimension B of FIG. 3, is identical to that previously described, that is, multiples of 16 inches. Similarly, width A' and width C' forming the inlet and outlet openings 118 and 120 respectively (FIG. 7.), are proportioned so as to correspond to duct sections positioned adjacent thereto. In this embodiment width A' and C' reduce the width of the duct section when completed by 4 inches, that is, the inlet end 135 is 4 inches larger than the outlet end 139.

Fold lines 138 and 140 as in the previous embodiment and lines indicated 142a, 142b and 144a at the forward end of the tongue-like projection 142 and the side 144 thereof indicate the point at which the edges are formed. Openings 146 formed through the main body portion 136 are provided to support a shaft 148 to pivotally mount diverter valve members 150. When assembled, wall sections 152 of equal length extend along the sides thereof and secondary side panels 132 close the side of the tongue section to thereby form the outlet opening 130. The take-off section 114 may be of the type as described previously or of any desired configuration. In the embodiment of FIG. 7 for example, a generally rectangular shaped upwardly extending take-off section 114 is shown at one side while the opposite side illustrates a rectangular laterally extending take-off section having a configuration corresponding to the outlet opening 130 can be utilized in connection with the duct system of the present invention.

Those skilled in the art will readily recognize that the stamping provided herein will provide an integrated duct system designed for the least restriction of air from the heating or cooling plant through the main trunk duct and to the take-off ducts and to wall and floor registers or the like. The stamping of FIGS. 3 and 6, when folded and assembled, has a 16 inch length or multiples thereof permitting the entire take-off system to be designed simply by counting the number of floor joists within the building structure. The entrance opening thereto begins with a particular size opening and subsequently attached duct sections are reduced in size. If for example, seven branches are desired, a stamping having a large width A is selected with intermediate stampings being of appropriately reduced width until the last section is arranged. In the preferred embodiment, the stamping is reduced width by 2 inches from inlet to outlet for each outlet opening 30 or 130 provided. The stamping of FIG. 3 for example, having a single tongue 34 to provide an outlet opening 30 is reduced from dimension A to dimension C by 2 inches. In the case of FIG. 6, having two tongues 134 providing two outlet openings 130 the reduction from dimension A' to C' is equal to 4 inches. Costs are accordingly reduced since the installer need only provide the parts required to complete the system previously designed. The necessity of onsite cutting and forming is considerably reduced also contributing significantly to overall cost savings. Through the use of standard size duct sections constructed in accordance with the invention, the main or trunk duct is readily constructed and inherently reduces in cross sectional area wherever an outlet occurs from the start to the finish. Thus, those skilled in the art will immediately recognize that the present invention provides a duct system which is easily and economical to manufacture and easy to use.

Those skilled in the art will also recognize that other embodiments and modifications incorporating the teachings of the invention may readily be made in light of this disclosure. For example, if joist spacing of other than 16 inches between centers is utilized in a building construction, the length of the stamping can be changed accordingly. While the duct system is generally described with reference to heating and cooling systems, it will be realized that the invention can be utilized in exhaust, dust collection, and similar duct systems with equal facility. Accordingly, all modifications employing the principles of this invention are to be considered as included in the appended claims unless these claims by their language expressly state otherwise.

The embodiments of the invention in which an exclusive property or privilege is claimed are defined as follows:

1. A sheet metal duct section having an inlet and outlet comprising in combination: a prestamped upper and lower spaced panel interconnected by spaced side panels, at least one side panel being shorter in length than said upper and lower panels and defining an opening through which at least a portion of flow through said inlet is diverted, said upper and lower panels having end edges and a central body portion extending the length and width of said duct section from said inlet to said outlet and formed tongue portions extending laterally beyond said shortened side, said stampings being folded along their end edges and cooperatively engaged with said side panels to form the air duct section, and said tongue portions cooperatively forming a diverter outlet to divert flow through said inlet from said outlet, said duct having a diminishing cross section from said inlet to said outlet.

2. The sheet metal duct section as defined in claim 1 and further including valve means in said duct section for closing said diverter outlet, said valve having supporting means thereon extending between said upper and lower panels and supporting said valve for pivotal movement, and means formed in said upper and lower panels for retaining said supporting means.

3. The duct section of claim 1 wherein said stamping includes a pair of said tongue members extending outwardly from each side of said stamping adjacent said inlet end to thereby form a pair of said diverter outlets adjacent said inlet.

4. The apparatus as defined in claim 3 and further including valve means in said duct section for closing each of said diverter outlets, said valve means having supporting means thereon extending between said upper and lower panels and supporting said valve means for pivotal movement, and means formed in said panels for retaining said supporting means.

* * * * *